United States Patent
Lin et al.

(10) Patent No.: US 10,448,137 B1
(45) Date of Patent: Oct. 15, 2019

(54) DUAL ZONE DISCHARGE OF RECHARGEABLE BATTERIES

(71) Applicant: Bose Corporation, Framingham, MA (US)

(72) Inventors: Lifun Lin, Framingham, MA (US); Daniel Lee, Framingham, MA (US); Stephen P. Darbin, Austin, TX (US); David E. Thomas, Hopkinton, MA (US); Victor A. Noel, Boston, MA (US)

(73) Assignee: Bose Corporation, Framingham, MA (US)

( * ) Notice: Subject to any disclaimer, the term of this patent is extended or adjusted under 35 U.S.C. 154(b) by 0 days.

(21) Appl. No.: 16/014,983

(22) Filed: Jun. 21, 2018

(51) Int. Cl.
*H04R 1/10* (2006.01)
*H02J 7/00* (2006.01)

(52) U.S. Cl.
CPC ............ *H04R 1/1025* (2013.01); *H02J 7/007* (2013.01); *H02J 7/0063* (2013.01); *H02J 7/0068* (2013.01); *H02J 2007/0067* (2013.01)

(58) Field of Classification Search
None
See application file for complete search history.

(56) References Cited

U.S. PATENT DOCUMENTS

| | | | |
|---|---|---|---|
| 6,372,379 B1 | 4/2002 | Samii et al. | |
| 6,459,243 B1 | 10/2002 | Kajiura | |
| 6,489,054 B2 | 12/2002 | Cheiky et al. | |
| 6,522,102 B1 | 2/2003 | Cheiky et al. | |
| 6,541,160 B2 | 4/2003 | Cheiky et al. | |
| 6,558,849 B2 | 5/2003 | Cheiky et al. | |
| 6,582,851 B2 | 6/2003 | Cheiky et al. | |
| 6,641,949 B2 | 11/2003 | Cheiky et al. | |
| 6,682,854 B2 | 1/2004 | Cheiky et al. | |
| 6,733,920 B2 | 5/2004 | Cheiky et al. | |

(Continued)

FOREIGN PATENT DOCUMENTS

| WO | WO 2008/39417 | 4/2008 |
|---|---|---|
| WO | WO 2008/39419 | 4/2008 |

(Continued)

OTHER PUBLICATIONS

Kainthla, et al.; "Long Life, High Energy Silver/Zinc Batteries"; NASA Aerospace Workshop; Nov. 19, 2002; 32 pages.

(Continued)

*Primary Examiner* — Curtis A Kuntz
*Assistant Examiner* — Kenny H Truong
(74) *Attorney, Agent, or Firm* — Fish & Richardson P.C.

(57) ABSTRACT

The technology described in this document can be embodied in a method of using a silver-zinc rechargeable battery to power a device. The method includes drawing, in a first mode of operation of a power management circuit, a first current from the battery to power the device. The first current is selected such that a target percentage of a capacity of the battery is discharged in a predetermined time of use of the device. The method also includes switching to a second mode of operation after the target percentage of the capacity of the battery is discharged. In the second mode of operation, a second current is drawn from the battery, wherein the second current is less than the first current. The method further includes powering the device using the second current.

16 Claims, 6 Drawing Sheets

(56) References Cited

U.S. PATENT DOCUMENTS

| | | |
|---|---|---|
| 6,743,548 B2 | 6/2004 | Cheiky et al. |
| 6,806,681 B1 | 10/2004 | Cheiky et al. |
| 6,884,542 B1 | 4/2005 | Cheiky et al. |
| 6,929,884 B2 | 8/2005 | Cheiky et al. |
| 6,943,530 B2 | 9/2005 | Cheiky et al. |
| 7,029,792 B2 | 4/2006 | Cheiky et al. |
| D586,738 S | 2/2009 | Zaremba |
| D586,739 S | 2/2009 | Zaremba |
| 7,488,558 B2 | 2/2009 | Cheiky et al. |
| 8,030,899 B2 | 10/2011 | Cromer et al. |
| 8,244,312 B2 | 8/2012 | Jakes et al. |
| 8,481,186 B2 | 7/2013 | Jakes et al. |
| 8,936,775 B2 | 1/2015 | Adamson et al. |
| 9,184,440 B2 | 11/2015 | Ortega et al. |
| 9,184,444 B2 | 11/2015 | Zhou et al. |
| 9,209,454 B2 | 12/2015 | Adamson et al. |
| 9,240,696 B2 | 1/2016 | Renken et al. |
| D757,944 S | 5/2016 | Bishop et al. |
| D757,945 S | 5/2016 | Bishop et al. |
| 9,401,509 B2 | 7/2016 | Ortega et al. |
| 2006/0216584 A1 | 9/2006 | Cheiky |
| 2006/0216596 A1 | 9/2006 | Cheiky |
| 2008/0038630 A1 | 2/2008 | Cheiky |
| 2011/0123850 A1 | 5/2011 | Duong et al. |
| 2011/0123859 A1 | 5/2011 | Huang et al. |
| 2011/0175571 A1 | 7/2011 | Renken et al. |
| 2011/0262803 A1 | 10/2011 | Huang et al. |
| 2012/0189896 A1 | 7/2012 | Zhou et al. |
| 2013/0024410 A1 | 1/2013 | Chan et al. |
| 2013/0141045 A1* | 6/2013 | Karim .................. H02J 7/0068 320/110 |
| 2013/0266872 A1 | 10/2013 | Adamson et al. |
| 2015/0028516 A1 | 1/2015 | Duong et al. |
| 2015/0249249 A1 | 9/2015 | Ortega et al. |
| 2015/0357859 A1 | 12/2015 | Pourdarvish et al. |
| 2018/0332408 A1* | 11/2018 | Frei ...................... H04R 25/602 |

FOREIGN PATENT DOCUMENTS

| | | |
|---|---|---|
| WO | WO 2012/48074 | 4/2012 |
| WO | WO 2015/108830 | 7/2015 |
| WO | WO 2015/138828 | 9/2015 |
| WO | WO 2015/195731 | 12/2015 |
| WO | WO 2015/195735 | 12/2015 |

OTHER PUBLICATIONS

Dueber, et al.; Rechargeable Silver-Zinc Batteries Will Soon Become the New Standard for Hearing Aids; Z/Power LLC; 2015; 8 pages.

Z/Power "Rechargeable Silver-Zinc button Cells" Brochure; Z/Power LLC; 2013; 22 pages.

Dueber; "Battery Power Products & Technology"; www.BatteryPowerOnline.com; Sep./Oct. 2008; vol. 12, Issue 5; 2 pages.

* cited by examiner

DUAL ZONE DISCHARGE OF RECHARGEABLE BATTERIES

TECHNICAL FIELD

This disclosure generally relates to rechargeable batteries, specifically silver-zinc batteries.

BACKGROUND

Silver Zinc batteries (also referred to AgO—Zn batteries) have become a popular choice for small devices such as hearing aids and personal acoustic devices. AgO—Zn rechargeable batteries are often preferred due to their high-energy, high power density characteristics.

SUMMARY

In one aspect, this document describes a method of using a silver-zinc rechargeable battery to power a device. The method includes drawing, in a first mode of operation of a power management circuit, a first current from the battery to power the device. The first current is selected such that a target percentage of a capacity of the battery is discharged in a predetermined time of use of the device. The method also includes switching to a second mode of operation after the target percentage of the capacity of the battery is discharged. In the second mode of operation, a second current is drawn from the battery, wherein the second current is less than the first current. The method further includes powering the device using the second current.

In another aspect, this disclosure features a device that includes an acoustic transducer, circuitry configured to drive the acoustic transducer using power from a rechargeable battery, and a power management circuit comprising one or more processing devices, the power management circuit. The power management circuit is configured to draw, in a first mode of operation, a first current from the battery to power the circuitry. The first current is selected such that a target percentage of a capacity of the battery is discharged in a predetermined time of use of the device. The power management circuit is further configured to switch to a second mode of operation after the target percentage of the capacity of the battery is discharged. In the second mode of operation, a second current is drawn from the battery, wherein the second current is less than the first current. The power management circuit is further configured to power the device using the second current.

Implementations of the above aspects can include one or more of the following features. The target percentage can be substantially equal to 50%. The first current can be substantially equal to 2.1 mA. The predetermined time of use of the device can be substantially equal to 8 hours. A determination may be made that the battery has been connected to a charger when an amount of charge in the battery is higher than the target percentage of the capacity, and in response to such determination, the battery can be discharged until at least the target percentage of the capacity of the battery is discharged. Charging of the battery can be initiated when the amount of charge remaining in the battery is less than the target percentage of the capacity of the battery. A counter to track a number of charging cycles of the battery can be updated, and some of the above steps can be repeated after a predetermined first number of charging cycles, as indicated by the counter. The battery can be discharged to a threshold level below the target percentage of the capacity of the battery after a predetermined second number of charging cycles, as indicated by the counter. A counter can be updated to track a number of charging cycles responsive to detecting a recharging of the battery, and the device can be powered using a third current drawn in accordance with a third mode of operation of the power management circuit, for a predetermined number of charging cycles of the battery, as indicated by the counter. The counter can be updated responsive to determining that the battery is discharged to a level below the target percentage of the capacity of the battery when a particular charging cycle is initiated Some of the above steps can be repeated after the predetermined number of charging cycles.

In another aspect, this document features a method of charging a rechargeable battery. The method includes receiving, by a charger, a connection to the battery, and determining, by a control circuit disposed in the charger, that an amount of charge remaining in the battery is more than a threshold percentage of a capacity of the battery. The method also includes, responsive to such determination, discharging the battery while being connected to the charger until at least the threshold percentage of the capacity of the battery is discharged, and initiating charging of the battery when the amount of charge remaining in the battery is less than the threshold percentage of the capacity of the battery.

In another aspect, this document features a device for charging a rechargeable battery. The device includes a set of electrical receptacles configured to receive a connection to the battery, and a control circuit that includes one or more processing devices. The control circuit is configured to determine that an amount of charge remaining in the battery is more than a threshold percentage of a capacity of the battery, and in response, discharge the battery while being connected to the device until at least the threshold percentage of the capacity of the battery is discharged. The control circuit is also configured to initiate charging of the battery when the amount of charge remaining in the battery is less than the threshold percentage of the capacity of the battery.

Implementations of the above aspects can include one or more of the following features. Discharging the battery can include generating an acoustic signal using a transducer powered by the battery. A frequency of the acoustic signal can be outside the human audible range. A counter to track a number of charging cycles of the battery can be updated, and can be used by the control circuit to determine that the battery has undergone a predetermined number of charging cycles. In response, the control circuit can be configured to determine that the amount of charge remaining in the battery is more than the threshold percentage of the capacity of the battery, and accordingly discharge the battery while being connected to the charger until at least the threshold percentage of the capacity of the battery is discharged. Charging of the battery can be initiated when the amount of charge remaining in the battery is less than the threshold percentage of the capacity of the battery. The rechargeable battery can be a silver-zinc (AgO—Zn) rechargeable battery. The silver-zinc rechargeable battery can be characterized by a discharging profile that includes (i) an upper plateau corresponding to a substantially constant first voltage and (ii) a lower plateau corresponding to a substantially constant second voltage that is less than the first voltage, and the threshold percentage of the capacity of the battery can correspond to a transition between the upper plateau and the lower plateau.

In some implementations, the technology described herein may provide one or more of the following advantages.

By drawing a large current from a rechargeable battery at least during one mode of discharge, dendrites formed during a charging process may be dissolved. This in turn may prevent the dendrites to become long enough to contact a side of the battery container and cause a shorting failure of the battery. Further, the large current draw during use, and/or a forced discharge of the battery down to a target percentage capacity prior to charging, can prevent impedance build-up within the battery. This in turn may also prevent shorting failures and/or improve service life of the battery. In addition, the large current draw during use, and/or a forced discharge of the AgO—Zn battery in a charger can force the battery into a lower plateau associated with such batteries. Initiating charging from the lower plateau may then utilize a charging-termination criterion that enables a more precise charging capacity control. Periodically charging from the lower plateau can therefore serve as a "reset" that brings the cell capacity back to the designed range.

Two or more of the features described in this disclosure, including those described in this summary section, may be combined to form implementations not specifically described herein.

The details of one or more implementations are set forth in the accompanying drawings and the description below. Other features, objects, and advantages will be apparent from the description and drawings, and from the claims.

DETAILED DESCRIPTION

This document describes a discharging/charging technology for a rechargeable battery (e.g., a silver-zinc battery) for improving the service life of the battery. Specifically, this document describes configuring the current draw from a charged battery such that a target percentage of the battery capacity is discharged within a predetermined amount of time. For a silver-zinc battery, this may ensure that the battery is forced to a particular portion of its discharge profile (e.g., a "lower plateau" of a discharge profile associated with such batteries) before recharging of the battery is initiated. In some cases, if the battery is placed in a charger before being discharged to the target percentage of the capacity, the charging process itself may be configured to first discharge the battery to the target percentage before initiating a recharging process. In some cases, drawing a high discharge current during an operation of the battery, and/or forcing the battery to the particular portion of the discharge profile at least periodically, may prevent dendrite formation in the battery, thereby reducing or delaying chances of shorting failure. Further, the technology described herein may also improve the service life of the battery, and/or maintain operation of the battery at or near the original design specifications.

Figure 1:
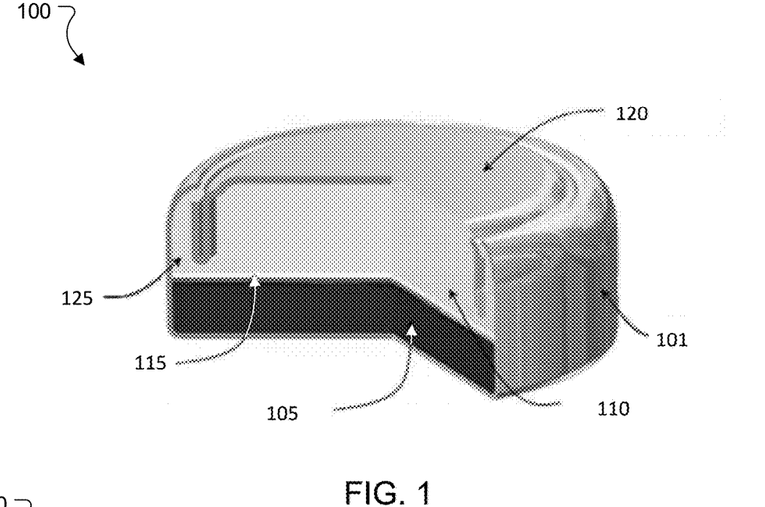
FIG. 1 is a schematic diagram illustrating the interior of an example of a silver-zinc battery.

Large form-factor silver-zinc batteries have been used in various military, aerospace, etc. applications. In recent times, improvements to silver-zinc technology, as well as miniaturization, have made silver-zinc batteries suitable for smaller devices such as hearing aids and personal acoustic devices such as acoustic earbuds. An example of a miniature silver zinc battery 100 is shown in FIG. 1. Batteries such as the one shown in FIG. 1 is developed by ZPower LLC of Camarillo, Calif. In a broad overview, the battery 100 includes a casing 101 that houses a silver (or silver oxide) cathode 105 and a zinc anode 110. A separator 115 is disposed between the anode and the cathode. In some implementations, a porous alkaline material such as KOH can be used in the separator 115. The battery 100 also includes a cap 120 that forms an electrical contact and a gasket 125 that electrically separates the cap 120 from the casing 101.

The terms "rechargeable battery," "battery," and "cell" are used interchangeably herein and refer to a power source capable of either providing electrical energy from chemical reactions, or facilitating chemical reactions when subjected to electrical energy. In some implementations, a battery may have multiple electrochemical cells. In some implementations, a battery may have a single cell. For example a button cell or a coin cell (e.g., the battery 100 shown in FIG. 1) is a battery having a single cell.

Silver-Zinc batteries can be particularly appealing in various applications due to their high-energy content and non-flammable chemistry. Specifically, the electrochemistry of a silver-zinc battery is as follows.

At the cathode:

At the anode:

Which yields the overall reaction as:

In some implementations though, the $Zn(OH)_4^{2-}$ formed at the cathode during a charging process exhibits dendritic growth, and the resulting dendrites permeate through the separator 115 to potentially cause a shorting condition in the battery. Specifically, over multiple charging/discharging cycles of the battery 100, the dendrites may grow long enough to breach the separator 115 completely and cause a shorting condition that reduces the service life of the battery. In addition, over multiple charging/discharging cycles of the battery, the internal impedance of the battery typically increases, thereby further contributing to potential shortening of the service life of the battery.

The technology described herein addresses the problems of dendrite formation and impedance building in silver-zinc batteries. Specifically, in one aspect, the technology espouses a high-current discharge of the battery when the battery is used to power a device. For example, the discharge current can be set at a level such that a target percentage of the battery capacity is depleted within a predetermined time of use of the corresponding device. During discharge, the discharging current is distributed between the Zn located inside the anode compartment and any dendrite formed in the separator. If the discharge current is set at a sufficiently high value, more current can be forced to be distributed onto the dendrite, thereby potentially causing the dendrite to be dissolved away. In some cases, this can prevent the dendrite from becoming long enough to contact the cathode can, and/or breaching the width of the separator. This in turn may prevent or at least reduce the chances of a shorting condition being created in the battery.

Figure 2:
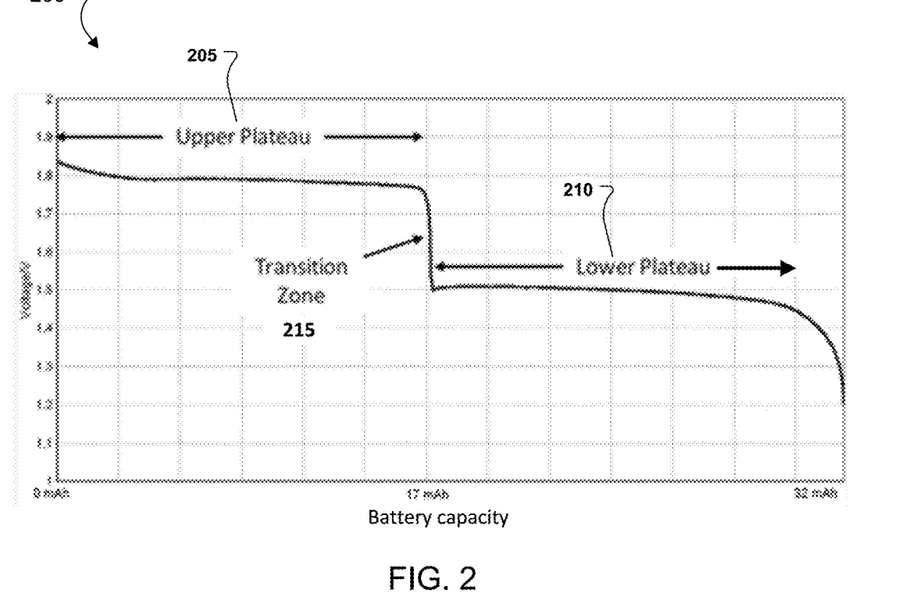
FIG. 2 is an example of a discharge profile associated with a silver-zinc battery.

In some implementations, to increase the chances of the discharging current being distributed adequately to the dendrites, it may be beneficial to force the discharge process into a particular portion of the discharging process. To illustrate, FIG. 2 shows an example of a discharge profile 200 associated with a silver-zinc battery. In this example, the discharging profile 200 includes a first portion 205 (referred to as the "upper plateau") that corresponds to a substantially constant first voltage region, and a second portion 210 (referred to as the "lower plateau") that corresponds to a substantially constant second voltage region. The second voltage is less than the first voltage and the transition zone 215 between the two corresponds to a particular percentage of the battery capacity. In this example, the battery capacity is 32 mAh, and the transition zone 215 corresponds to about 17 mAh (i.e., approximately 50% of the battery capacity).

As used herein, the term "plateau", refers to a range of battery capacities wherein the battery's voltage remains substantially unchanged, e.g., having a variance of ±10% or less or having a variance of ±5% or less, when the battery is being charged with a substantially constant charge current. In some implementations, a plateau may be characterized or identified by the lowest voltage on the plateau. In some implementations, a plateau may be characterized or identified by the average voltage over the range of battery capacity.

In some implementations, when the discharge takes place over the upper plateau 205 of the discharge curve, adequate zinc may be available in the anode compartment to carry out the discharge action, and therefore the discharge current may not be distributed to any dendrites. Furthermore, a low discharge current may not provide enough driving force to distribute the discharge current to the dendrites. To address this, the technology described herein espouses forcing the discharge process to the lower plateau at least intermittently. When the discharge process is in the lower plateau 210, the residual capacity of the battery is such that there may not be adequate zinc available at the anode to carry out the discharge action. This may force the discharge current to be forced into any dendrites formed in the separator 115 causing the dendrites to be dissolved away.

Forcing the discharge into the lower plateau 210 can be referred to as a maintenance cycle, which can be beneficial in multiple ways. For example, if the battery is discharged to about midway of the lower plateau 210, the amorphous (hydrated) silver oxide in the cathode may decompose and release $H_2O$ & $OH^-$, which in turn may diffuse from cathode to anode and flush out any $Zn(OH)_4^{-2}$ ions in the separator (which, as described above, are the sources of dendrite formation in separator). Furthermore, initiating the charging from the lower plateau can allow for the use of a charging-termination criterion that enables a more precise charging capacity control. An example of a charging process (and associated criteria) is described in U.S. Pat. No. 9,240,696, the entire content of which is incorporated herein by reference. In some cases, charging from the lower plateau 210 may therefore serve as a "reset" that maintains the battery capacity at or near the target or design specifications. In some implementations, forcing the discharge into the lower plateau 210 can also prevent/reduce impedance build-up in the battery over multiple charge/discharge cycles, thereby improving the overall service life of the rechargeable battery.

Figure 3:
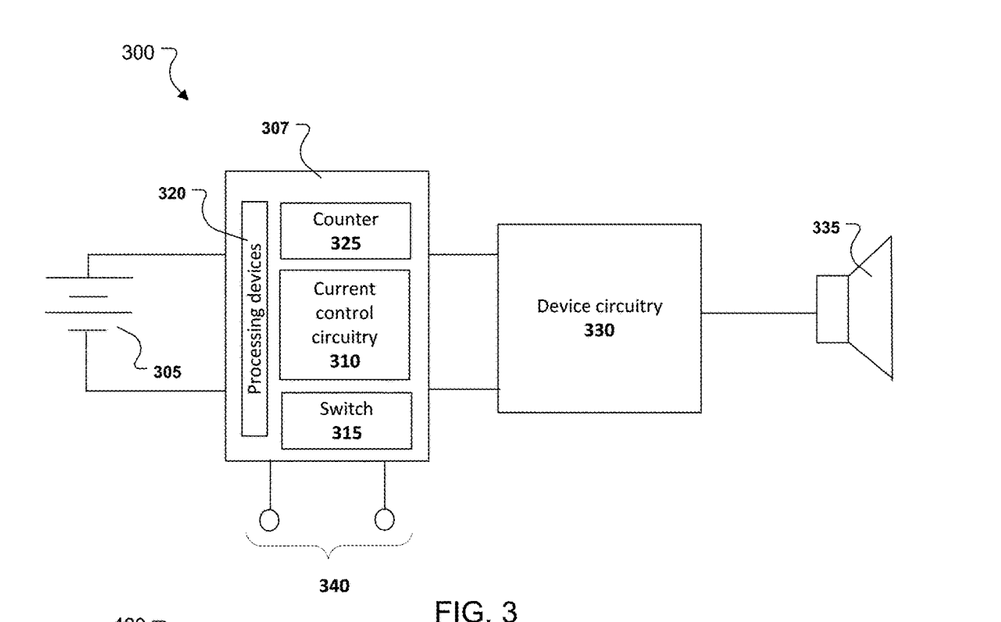
FIG. 3 is a block diagram of an example acoustic device that uses rechargeable batteries in accordance with technology described herein.

The technology described herein may be implemented in various ways. FIG. 3 is a block diagram of an example acoustic device 300 that uses rechargeable batteries 305 in accordance with technology described herein. In some implementations, the device 300 is a personal acoustic device (e.g., a hearing aid or a personal acoustic device such as a wireless earbud) that includes an acoustic transducer 335 driven by device circuitry 330. The device circuitry 330 is powered by one or more batteries 305. In some implementation a battery 305 can include one or more of the rechargeable batteries (or cells) 100 described above with reference to FIG. 1. The charging/discharging processes of the battery 305 can be controlled using a power management circuit 307 disposed between the batteries 305 and the device circuitry 330. The power management circuit 307 can include one or more electrical contacts 340 configured to electrically couple the power management circuit (or the device 300) to a charger configured to charge the rechargeable batteries 305. The power management circuit 307 also includes one or more processing devices 320 to execute processes associated with managing charging/discharging of the batteries 305 in accordance with technology described herein.

In some implementations, the power management circuit 307 includes current control circuitry 310 that is configured to control the current drawn from the batteries 305 to power the device circuitry 330. In some implementations, the power management circuit 307 is operated in multiple modes of operation. For example, in a first mode of operation, the power management circuit 307 can be configured to draw a first current from the battery 305 to power the device such that a target percentage of a capacity of the battery is discharged in a predetermined time of use of the device. Referring back to FIG. 2, the first current can be selected such that the battery 305 is forced into the lower plateau 210 during a predetermined amount of time of use of the device 300. For example, if the device 300 is an acoustic earbud, the first current can be selected as being substantially equal to 2.1 mA, such that the residual battery capacity corresponding to approximately 8 hours of use is approximately 17 mAh, which in turn forces the discharge profile into the lower plateau 210. The predetermined time of 8 hours can be selected, for example, based on empirical data of earbud use times across a large number of consumers. In some cases, this can ensure that at least a significant percentage of consumers are recharging the devices only after the discharge is forced into the lower plateau 210.

In some implementations, the predetermined time period and/or the first current can be determined based on one or more other criteria. For example, the power management circuit 307 can be configured to track the daily time of use for a particular device 300. The current control circuitry 310 can then be configured to select the first current and/or the predetermined time accordingly, such that the discharge is forced into the lower plateau 210 during a regular daily use of the particular device 300. In some implementations, the first current can be selected (or at least lower bounded) based on a target discharge current that is distributed into the dendrites formed during a charging process.

In some implementations, once the battery 305 is discharged down to a target percentage of the capacity, the power management circuit can be configured to switch into a second mode of operation, in which the current drawn from the battery is changed. In some implementations, the current drawn in this mode (referred to as the second current) is less than the first current, for example, to ensure that the device 300 is powered for an adequate time. For example, the second current can be selected as 1.6 mA such that a target utilization for the battery (e.g., approximately 92.5% for the example shown in FIG. 2) is reached in another predetermined amount of use time of the device. In the example of FIG. 2, the current control circuitry can be configured to select the second current as 1.6 mA to ensure at least 8 hours of usage while traversing the lower plateau 210.

In some implementations, the power management circuit 307 includes a switch 315 that controls recharging of the battery 305 when the battery 305 (or the device 300) is placed in a charger. For example, the power management circuit 307 can be configured to first determine (e.g., by processing information from one or more sensors using the processing devices 320) that the battery 305 has been connected to a charger, and that an amount of charge in the battery is higher than the target percentage of the capacity. In other words, the power management circuit 307 can be configured to determine that the discharge of the battery 305 is still in the upper plateau region 205 of the corresponding discharging profile. Responsive to such determination, the power management circuit can be configured to continue discharging the battery 305 until the target percentage of the capacity has been discharged, even though the device 300 is connected to the charger (e.g. via the one or more electrical contacts 340). For example, during such a discharge period, the switch 315 can be configured to disconnect the electrical contacts 340 from any charging circuitry associated with the batteries 305. In some implementations, the switch 315 can act as a multi-way switch, which connects the batteries 305 to the device circuitry 330 to continue discharging of the battery while the device 300 is connected to the charger. The discharging can be facilitated by using the battery 305 to generate an acoustic signal through the acoustic transducer 335 (possibly in a frequency range outside the human audible range), or in other ways that drain the batteries 305. Once the battery 305 is discharged to the target percentage of the capacity, the switch 315 can be configured to disconnect the battery 305 from powering the device circuitry 330, and/or connect the electrical contacts 340 to the battery such that the battery 305 can be charged from the charger.

In some implementations, the power management circuit 307 can be configured to force the discharge process into the lower plateau 210 intermittently. For example, the power management circuit 307 can include a counter 325 that is updated to keep track of a number of charging cycles undergone by the battery 305, and the discharge process is forced into the lower plateau only after a predetermined number of charge cycles. For example, the power management circuit 307 can be configured to operate in the first mode of operation and draw a high current to force the discharging into the lower plateau, not in each discharge cycle, but only after a predetermined number of cycles (e.g., every $3^{rd}$ cycle, every $5^{th}$ cycle, every $10^{th}$ cycle etc.). In the other cycles (e.g., when the power management circuit 307 is not attempting to force the discharge into the lower plateau within a predetermined time), the current control circuitry can be configured to operate in the second mode of operation, or another mode of operation where the current drawn is different from that drawn in either the first mode of operation or the second mode of operation. For example, when the power management circuit 307 is not attempting to force the discharge into the lower plateau, the current control circuitry 310 can be configured to draw 1.35 mA of current, which allows for approximately 12.5 hours of use time until the target percentage of the capacity is discharged. In some cases, this may allow for the device 300 to be used for a longer period of time, and hence combining the multiple modes of operations may be useful in achieving a trade-off between service life and lengths of use in individual cycles.

Figure 4:
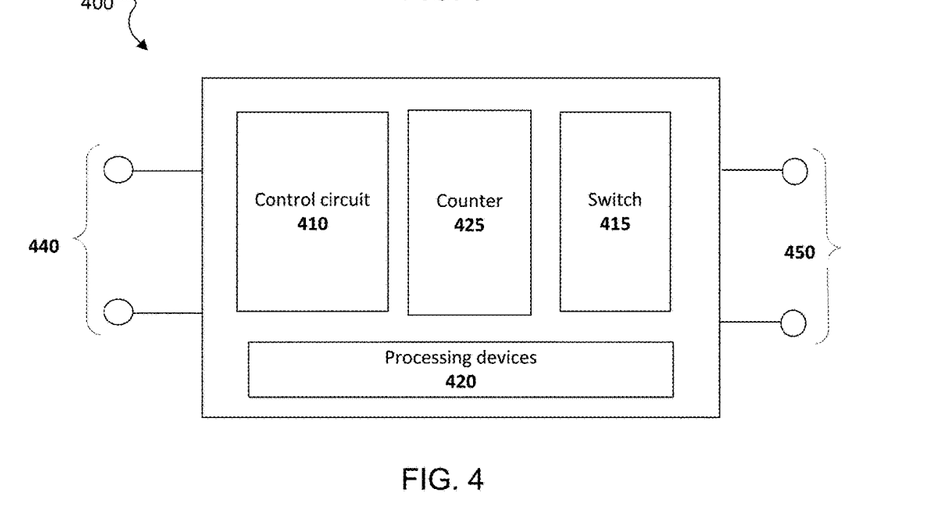
FIG. 4 is a block diagram of an example charger in accordance with technology described herein.

FIG. 4 is a block diagram of an example charger 400 that functions in accordance with technology described herein. The charger 400 includes a first set of electrical contacts 440 to couple with mating contacts 340 of the device 300. The charger 400 also includes a second set of electrical contacts 450 to connect to a power source such as a battery, a wall socket, a cable, etc. that connect to a power source. In some implementations, the second set of electrical contacts includes a standard port such as universal serial bus (USB) port or a Lightning port for connecting to corresponding power sources through appropriate connectors or cables.

In some implementations, the charger 400 includes control circuit 410 that is configured to manage charging/discharging of a battery connected to the charger. The control circuit 410 can be configured to manage the charging/discharging of a connected battery independently of (or in absence of) any power management circuit 307 in the device powered by the battery. For example, the control circuit 410 can be configured to determine that an amount of charge remaining in the connected battery is more than a threshold percentage of a capacity of the battery, and in response, continue to discharge the battery until at least the threshold percentage of the capacity of the battery is discharged. In this regard, at least a portion of the functionalities of the control circuit 410 can be substantially similar to that of a power management circuit 307, as described above. Also, during a discharge period, the switch 415 of the charger 400 can be configured to disconnect the electrical contacts 450 from the electrical contacts 440 to prevent providing charging current to any connected battery.

In some implementations, the charger 400 can include a counter 425, the functionality of which is analogous to the counter 325 described above with reference to FIG. 3. For example, the counter 425 can be updated to keep track of a number of charging cycles undergone by a battery connected to the charger, and the discharge process is forced into the lower plateau only after a predetermined number of charge cycles. For example, the control circuit can be configured to discharge the battery until at least the threshold percentage of the capacity of the battery is discharged once per predetermined number of charge cycles, as indicated by the counter 425. In some implementations, the charger 400 can be configured to receive identification information associated with the connected battery, such that the control circuit 410 can keep track of charge cycles for various individual batteries using the counter 425. The one or more processing devices 420 can be configured to execute at least a portion of the process executed by the charger to control the charge/discharge of any connected batteries.

Figure 5A:
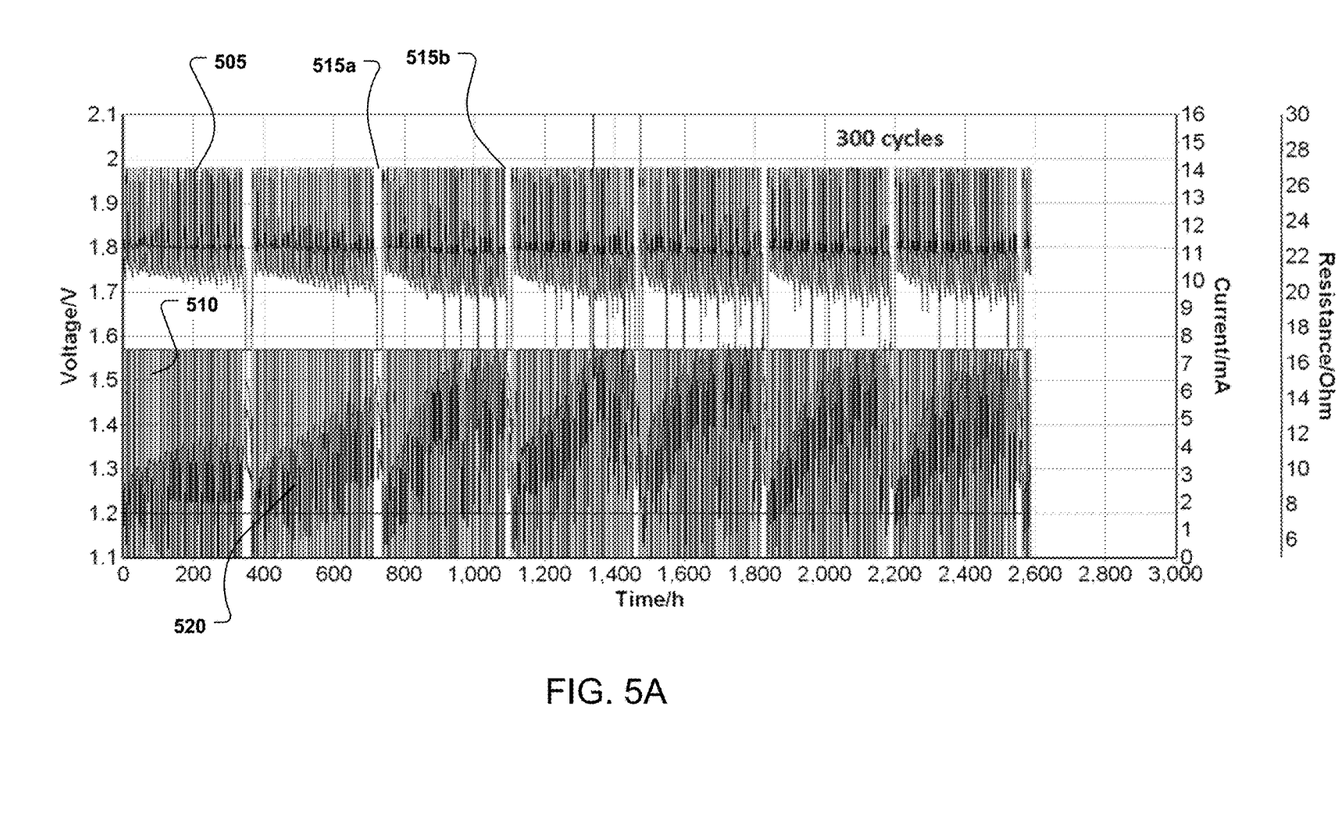
FIGS. 5A and 5B are plots illustrating a reduction in impedance build-up in a rechargeable battery due to using technology described herein.
Figure 5B:
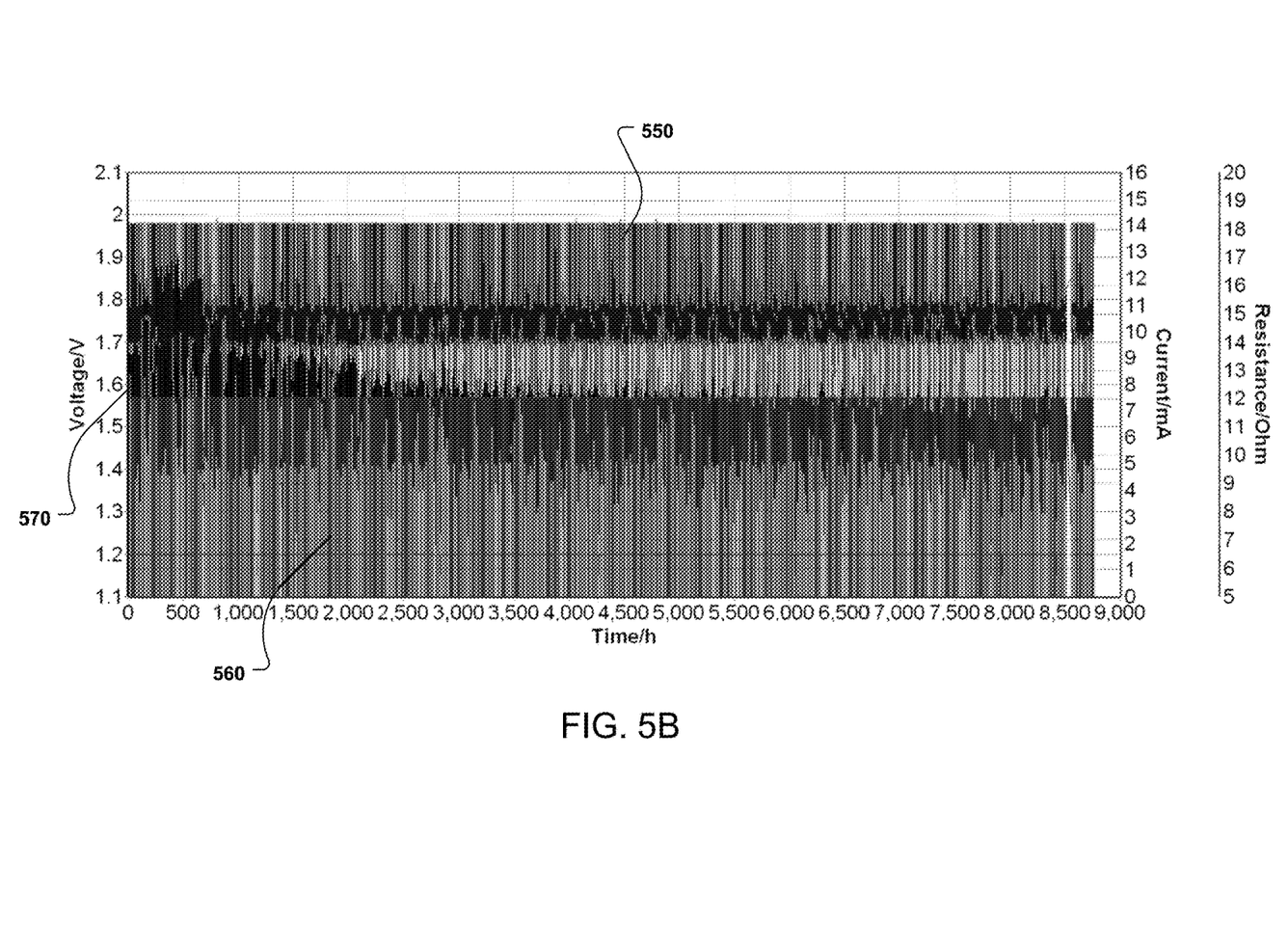

FIGS. 5A and 5B are plots illustrating a reduction in impedance build-up in a rechargeable battery due to using technology described herein. Specifically, in FIG. 5A, the curve 510 represents current drawn from a battery over multiple discharge cycles (over 350 cycles of 7 mAh-13 mAh spanning over 2600 hours), and the curve 505 represents voltages during the corresponding discharge cycles. The voltage curve 505 being at a level higher than 1.7V in most cycles indicates that the discharge happens primarily in the "upper plateau," with the discharge being forced into the lower plateau (<1.6V) once every 50 cycles (as indicated by the notches 515a, 515b etc.). The curve 520 tracks the impedance in the battery (in ohm, as noted by the Y-axis on the right) in the corresponding cycles. As observed from the trajectory of the curve 520, the impedance of the battery generally increases over discharge cycles that are in the upper plateau. Once the discharge is forced into the lower plateau every 50 cycles, the impedance reduces immediately, and continues to increase again over the upper plateau cycles.

FIG. 5B tracks the impedance (as indicated by the curve 570) over multiple discharge cycles of 12 mAh-21 mAh spanning more than 8500 hours. In this experiment, three out of every seven discharges were forced into the lower plateau, and the cell was fully discharged (e.g., depleted to over 90% of capacity) every 50 cycles. The curves 550 and 560 represent the voltage and current during the discharge cycles. In this case, the impedance build-up (as indicated by the trajectory of the curve 570) was even less, and stayed at a steady-state low value after around 100 cycles.

Figure 6:
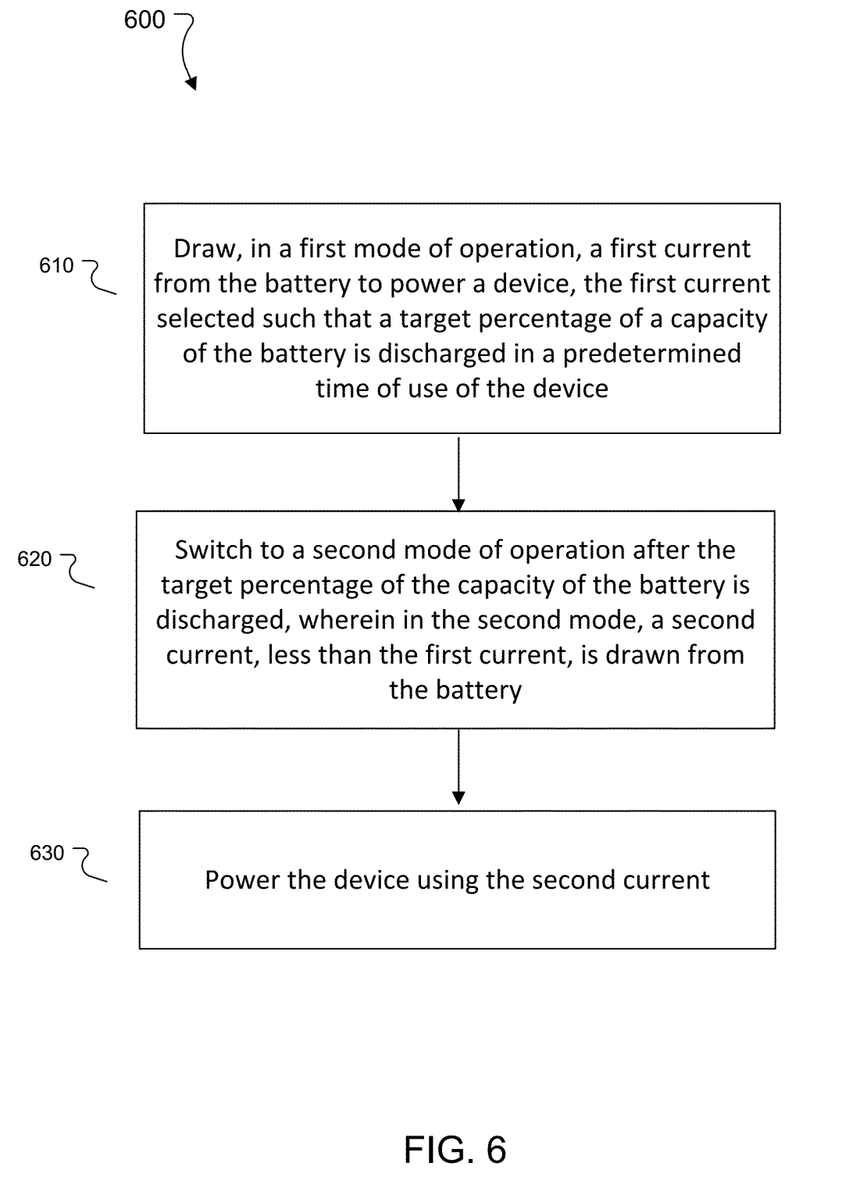
FIG. 6 is a flow chart of an example process for using a silver-zinc battery.

FIG. 6 is a flow chart of an example process 600 for using a silver-zinc battery. In some implementations, at least a portion of the process 600 is executed by the power management circuit 307 of FIG. 3 using the one or more processing devices 320. Operations of the process 600 includes drawing, in a first mode of operation of the power management circuit, a first current from the battery to power a device, wherein the first current is selected such that a target percentage of a capacity of the battery is discharged in a predetermined time of use of the device (610). In some implementations, the target percentage is substantially equal to 50% (e.g., between 47% and 53%) and/or the first current is substantially equal to 2.1 mA (or another suitable value for discharging down to the target percentage in the predetermined amount of time). In some implementations, the predetermined time of use of the device is substantially equal to 8 hours.

Operations of the process 600 also includes switching to a second mode of operation after the target percentage of the capacity of the battery is discharged (620), and powering the device using the second current (630). In the second mode of operation, a second current is drawn from the battery, the second current being less than the first current. For example, the second current can be substantially equal to 1.6 mA.

In some implementations, the process 600 can also include determining that the battery has been connected to a charger when an amount of charge in the battery is higher than the target percentage of the capacity. Responsive to such determination, the battery can be discharged (while connected in the charger) until at least the target percentage of the capacity of the battery is discharged. The process 600 can also include initiating charging of the battery when the amount of charge remaining in the battery is less than the target percentage of the capacity of the battery. In some implementations, a counter can be updated to track a number of charging cycles of the battery, and the above steps (e.g. the steps executed when the battery is in the charger) can be repeated after a predetermined number of charging cycles, as indicated by the counter. In some implementations, the battery can be discharged to a threshold level below the target percentage of the capacity of the battery after another predetermined number of charging cycles, as indicated by the counter. For example, in the experiment corresponding to FIG. 5B, the discharge was forced to the target percentage (approx. 50%) of the capacity in three out of seven cycles, and the battery was discharged to less than 10% of the capacity once every 50 cycles. In some implementations, the process 600 also includes updating a counter to track a number of charging cycles responsive to detecting a recharging of the battery, powering the device using a third current drawn in accordance with a third mode of operation of the power management circuit, for a predetermined number of charging cycles of the battery, and repeating the steps 610, 620, and 630 after the predetermined number of charging cycles. In some implementations, the third current can be significantly different from the second current. In some implementations, the third current can be substantially equal to the second current.

Figure 7:
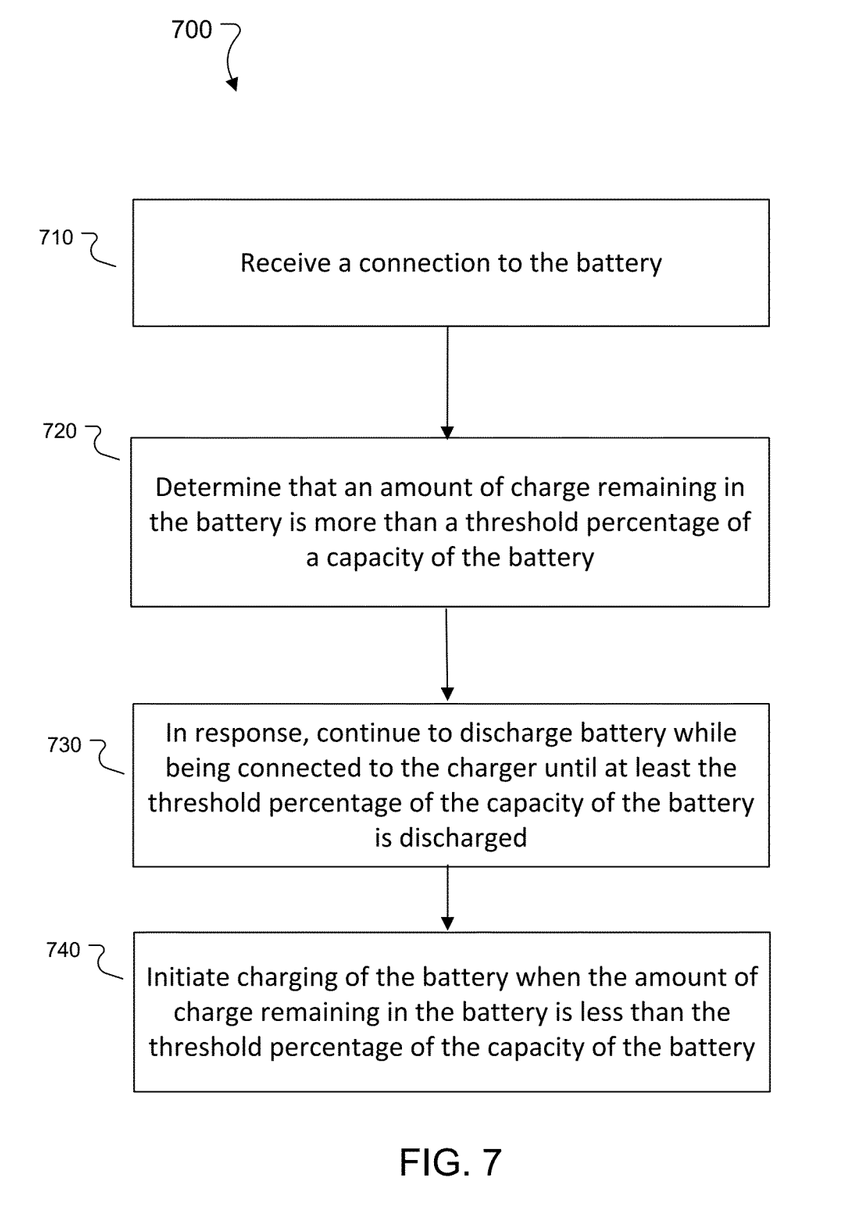
FIG. 7 is a flow chart of an example process for charging a rechargeable battery.

FIG. 7 is a flow chart of an example process 700 for charging a rechargeable battery. In some implementations, at least a portion of the process 700 is executed by the charger 400 described with reference to FIG. 4, using the one or more processing devices 420. Operations of the process 700 includes receiving a connection to a rechargeable battery (710). The connection can be received, for example, when a set of electrical contacts 440 of the charger 400 (FIG. 4) is electrically coupled to a set of electrical contacts 340 of the device 300 (FIG. 3).

Operations of the process 700 also includes determining that an amount of charge remaining in the battery is more than a threshold percentage of a capacity of the battery (720). In some implementations, the rechargeable battery is a silver-zinc (AgO—Zn) rechargeable battery, which is characterized by a discharging profile that includes (i) an upper plateau corresponding to a substantially constant first voltage and (ii) a lower plateau corresponding to a substantially constant second voltage that is less than the first voltage. For example, the discharging profile can be substantially similar to that illustrated in FIG. 2. In such cases, the threshold percentage of the capacity of the battery can correspond to a transition between the upper plateau and the lower plateau.

The functionality described herein, or portions thereof, and its various modifications (hereinafter "the functions") can be implemented, at least in part, via a computer program product, e.g., a computer program tangibly embodied in an information carrier, such as one or more non-transitory machine-readable media or storage device, for execution by, or to control the operation of, one or more data processing apparatus, e.g., a programmable processor, a computer, multiple computers, and/or programmable logic components.

Operations of the process 700 also includes continuing, responsive to determining that the amount of charge remaining in the battery is more than the threshold percentage of the capacity of the battery, to discharge the battery while being connected to the charger until at least the threshold percentage of the capacity of the battery is discharged (730). In some implementations, continuing to discharge the battery includes generating an acoustic signal using a transducer powered by the battery. For example, the acoustic transducer can be substantially similar to the acoustic transducer 335 disposed in the device 300 (FIG. 3) that is powered by the battery. In some implementations, the acoustic transducer can also be disposed in the charger 400. In some implementations, a frequency of the acoustic signal is outside the human audible range such that the acoustic signal is not perceptible to human users during the discharge process.

The operations of the process 700 also includes initiating charging of the battery when the amount of charge remaining in the battery is less than the threshold percentage of the capacity of the battery (740). In some implementations, the steps 720, 730, and 740 may be repeated after a predetermined number of charge cycles. For example, a counter can be updated each time a battery is charged to capacity to track a number of charging cycles of the battery. A determination may then be made that the battery has undergone a predetermined number of charging cycles, as indicated by the counter, and in response, the steps 720, 730, and 740 may be repeated.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the functions can be performed by one or more programmable processors executing one or more computer programs to perform the functions of the calibration process. All or part of the functions can be implemented as, special purpose logic circuitry, e.g., a Field Programmable Gate Array (FPGA) and/or an application-specific integrated circuit (ASIC).

Processors suitable for the execution of a computer program include, by way of example, both general and special purpose microprocessors, and any one or more processors of any kind of digital computer. Generally, a processor will receive instructions and data from a read-only memory or a random access memory or both. Components of a computer include a processor for executing instructions and one or more memory devices for storing instructions and data.

Other embodiments not specifically described herein are also within the scope of the following claims. For example, while the description of the silver zinc batteries above primarily refer to a silver or AgO cathode, other silver compounds are also within the scope of the disclosure. For example, $Ag_2O$, $Ag_2O_3$, AgOH, AgOOH, AgONa, $AgCuO_2$, $AgFeO_2$, $AgMnO_2$, $Ag(OH)_2$, hydrates thereof, or any combination of the foregoing materials may also be used in what is referred to herein as silver-zinc batteries. Further, any of the above-mentioned species that are doped and/or coated with dopants and/or coatings to enhance one or more properties of the silver, are also within the scope of this disclosure. In addition, other anode materials can be used either in conjunction with, or in place of, zinc.

Elements of different implementations described herein may be combined to form other embodiments not specifically set forth above. Elements may be left out of the structures described herein without adversely affecting their operation. Furthermore, various separate elements may be combined into one or more individual elements to perform the functions described herein.

What is claimed is:

1. A method of using a silver-zinc rechargeable battery to power an acoustic device, the method comprising:
drawing, in a first mode of operation of a power management circuit, a first current from the battery to power the acoustic device, wherein the first current is selected such that a target percentage of a capacity of the battery is discharged in a predetermined time of use of the acoustic device;
switching to a second mode of operation after the target percentage of the capacity of the battery is discharged, wherein in the second mode of operation, a second current is drawn from the battery, the second current being less than the first current; and
powering the acoustic device using the second current.

2. The method of claim 1, wherein the target percentage is substantially equal to 50%.

3. The method of claim 1, wherein the predetermined time of use of the acoustic device is substantially equal to 8 hours.

4. The method of claim 1, further comprising:
determining that the battery has been connected to a charger when an amount of charge in the battery is higher than the target percentage of the capacity;
responsive to determining that the battery has been connected to the charger when the amount of charge in the battery is higher than the target percentage of the capacity, discharging the battery until at least the target percentage of the capacity of the battery is discharged; and
initiating charging of the battery when the amount of charge remaining in the battery is less than the target percentage of the capacity of the battery.

5. The method of claim 4, further comprising updating a counter to track a number of charging cycles of the battery.

6. The method of claim 5, further comprising repeating the steps of claim 4 after a predetermined first number of charging cycles, as indicated by the counter.

7. The method of claim 5, further comprising discharging the battery to a threshold level below the target percentage of the capacity of the battery after a predetermined second number of charging cycles, as indicated by the counter.

8. The method of claim 1, further comprising
updating a counter to track a number of charging cycles responsive to detecting a recharging of the battery;
powering the acoustic device using a third current drawn in accordance with a third mode of operation of the power management circuit, for a predetermined number of charging cycles of the battery, as indicated by the counter; and
repeating the steps of claim 1 after the predetermined number of charging cycles.

9. A device comprising:
an acoustic transducer;
circuitry configured to drive the acoustic transducer using power from a rechargeable battery; and
a power management circuit comprising one or more processing devices, the power management circuit configured to:
draw, in a first mode of operation, a first current from the battery to power the circuitry, wherein the first current is selected such that a target percentage of a capacity of the battery is discharged in a predetermined time of use of the device,
switch to a second mode of operation after the target percentage of the capacity of the battery is discharged, wherein in the second mode of operation, a second current is drawn from the battery, the second current being less than the first current, and
power the device using the second current.

10. The device of claim 9, wherein the target percentage is substantially equal to 50%.

11. The device of claim 9, wherein the predetermined time of use of the device is substantially equal to 8 hours.

12. The device of claim 9, wherein the power management circuit is further configured to:
   determine that the battery has been connected to a charger when an amount of charge in the battery is higher than the target percentage of the capacity;
   responsive to determining that the battery has been connected to the charger when the amount of charge in the battery is higher than the target percentage of the capacity, discharge the battery until at least the target percentage of the capacity of the battery is discharged; and
   initiate charging of the battery when the amount of charge remaining in the battery is less than the target percentage of the capacity of the battery.

13. The device of claim 12, further comprising a counter that tracks a number of charging cycles of the battery.

14. The device of claim 13, wherein the power management circuit is configured to repeat the steps of claim 11 after a predetermined first number of charging cycles, as indicated by the counter.

15. The device of claim 13, wherein the power management circuit is configured to discharge the battery to a threshold level below the target percentage of the capacity of the battery after a predetermined second number of charging cycles, as indicated by the counter.

16. The device of claim 9, wherein the power management circuit is configured to:
   update a counter to track a number of charging cycles of the battery;
   power the device using a third current drawn in accordance with a third mode of operation of the power management circuit, for a predetermined number of charging cycles of the battery, as indicated by the counter; and
   repeat the steps of claim 9 after the predetermined number of charging cycles.

* * * * *